United States Patent
Zanolin et al.

(10) Patent No.: US 9,544,426 B2
(45) Date of Patent: Jan. 10, 2017

(54) METHOD FOR TRANSMITTING DATA RELATED TO A CALL

(71) Applicant: ORANGE, Paris (FR)

(72) Inventors: Gilles Zanolin, Eybens (FR); Sylvie Tournoud, Meylan (FR)

(73) Assignee: Orange, Paris (FR)

( * ) Notice: Subject to any disclaimer, the term of this patent is extended or adjusted under 35 U.S.C. 154(b) by 0 days.

(21) Appl. No.: 14/960,216

(22) Filed: Dec. 4, 2015

(65) Prior Publication Data

US 2016/0182712 A1 Jun. 23, 2016

(30) Foreign Application Priority Data

Dec. 19, 2014 (FR) .................................... 14 63014

(51) Int. Cl.
| | |
|---|---|
| H04M 1/56 | (2006.01) |
| H04M 15/06 | (2006.01) |
| H04M 3/42 | (2006.01) |
| H04W 8/18 | (2009.01) |
| H04W 8/20 | (2009.01) |
| H04L 29/08 | (2006.01) |

(52) U.S. Cl.
CPC .......... *H04M 3/42042* (2013.01); *H04L 67/00* (2013.01); *H04M 3/42* (2013.01); *H04W 8/18* (2013.01); *H04W 8/205* (2013.01)

(58) Field of Classification Search
CPC .............. H04M 1/72569; H04M 1/575; H04M 1/72552; H04M 2203/655; H04M 3/51; H04M 3/5191; H04M 3/4365; H04M 7/0054; H04L 67/34; G06F 17/30997
USPC ............ 379/142.01, 142.04, 142.05, 142.09, 379/142.14, 142.17, 352, 353, 355.06, 379/355.07, 355.09, 356.01, 355.04

See application file for complete search history.

(56) References Cited

U.S. PATENT DOCUMENTS

| | | | |
|---|---|---|---|
| 9,203,954 B1 * | 12/2015 | Van Rensburg .. | H04M 3/42042 |
| 2002/0126814 A1 | 9/2002 | Awada | |
| 2003/0133553 A1 | 7/2003 | Khakoo | |
| 2007/0263839 A1 * | 11/2007 | Gandhi ............ | H04M 3/42068 379/265.02 |
| 2008/0152097 A1 * | 6/2008 | Kent ...................... | H04L 12/66 379/93.01 |
| 2009/0193038 A1 * | 7/2009 | Butt ................. | G06F 17/30997 |
| 2010/0034361 A1 * | 2/2010 | Raghav ................ | H04M 1/575 379/88.13 |
| 2010/0279666 A1 * | 11/2010 | Small .................... | H04M 1/576 455/414.1 |
| 2010/0329438 A1 | 12/2010 | Yang et al. | |

(Continued)

OTHER PUBLICATIONS

The French Search Report for the FR 1463014 application.

*Primary Examiner* — Binh Tieu
(74) *Attorney, Agent, or Firm* — Haverstock & Owens LLP

(57) ABSTRACT

The invention relates to a method for transmitting data on a terminal in a call, such that it comprises, when a call initiated from the terminal is set up to another party, steps of determining (301) the call number of the correspondent; of reading (302) a configuration information item comprising at least one association between the determined call number and a datum identifier, the datum identifier being associated with a command to obtain the datum; of obtaining (303), by executing the associated command, the identified datum, and of transmitting (305) the datum to a recipient. The invention relates also to a communication terminal implementing the method.

8 Claims, 5 Drawing Sheets

(56) References Cited

U.S. PATENT DOCUMENTS

Figure 1:
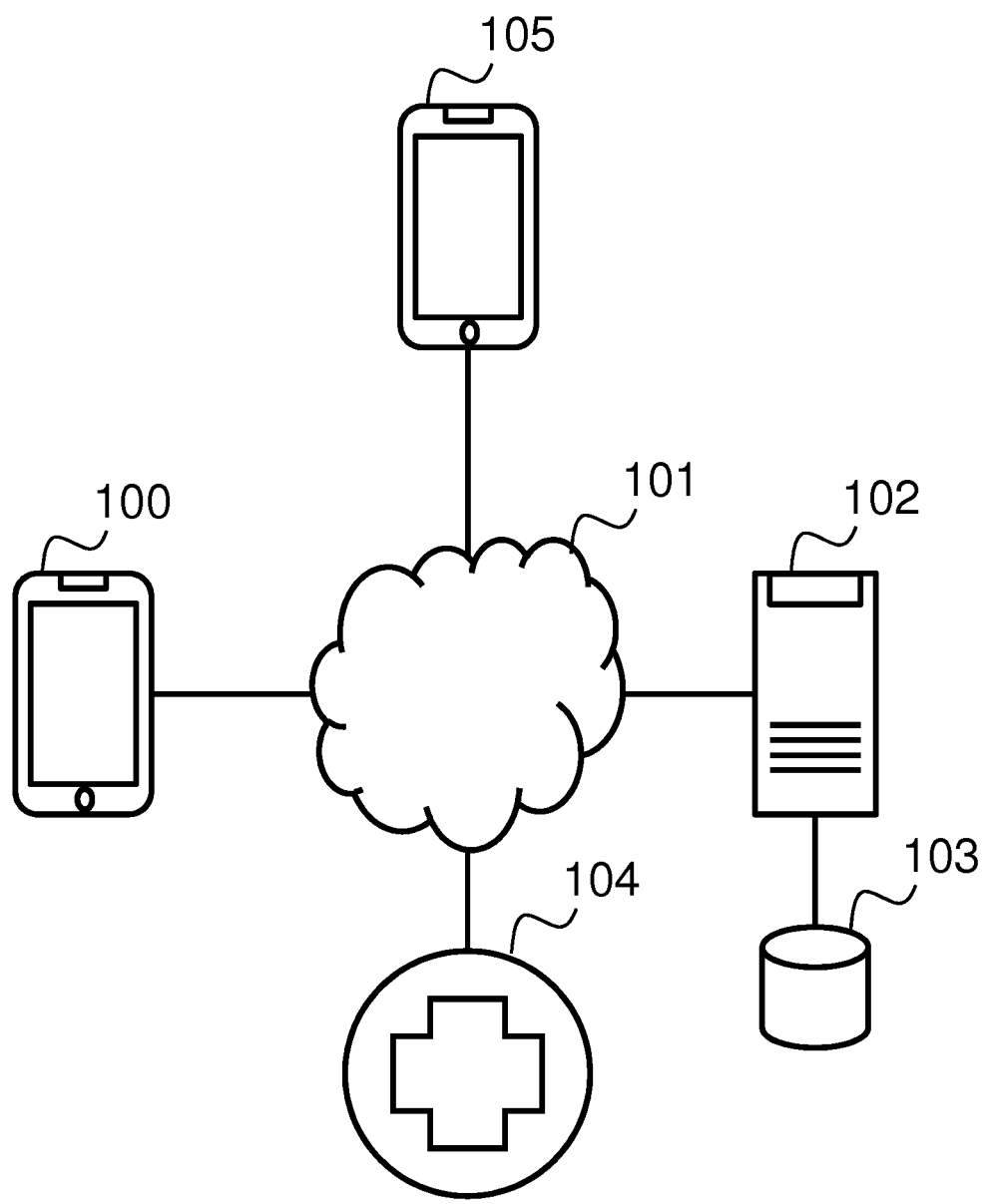

| | | | |
|---|---|---|---|
| 2013/0195258 A1* | 8/2013 | Atef | H04L 67/34 |
| | | | 379/88.01 |
| 2014/0376704 A1* | 12/2014 | Mairs | H04M 7/0057 |
| | | | 379/93.01 |
| 2015/0342542 A1* | 12/2015 | An | A61B 5/747 |
| | | | 455/404.2 |
| 2016/0156467 A1* | 6/2016 | Seo | H04L 9/3236 |
| | | | 713/171 |

* cited by examiner

METHOD FOR TRANSMITTING DATA RELATED TO A CALL

TECHNICAL FIELD

The invention relates to the field of telecommunications and relates in particular to a method that makes it possible to enrich a voice call.

PRIOR ART

The digital technologies and smart terminals of smartphone type have been part of our daily life for a number of years now.

The deployment of these technologies within the population causes certain services to be improved and new usages to be adopted. Such new usages expand for example through applications downloaded and installed on the terminals by the users. These applications make use of the sensors of the terminal and wireless connectivity to offer innovative and sophisticated services. For example, it is possible to obtain GPS coordinates corresponding to the location of the terminal, to look up and update an electronic diary, or even take and look up notes. Thus, the user can at any time access useful information such as, for example, his or her geographic position, a client number, the time or the address of a meeting, or even a confidential code.

Access to such information does however require a certain number of operations which are often difficult to perform in certain situations. For example, when a user is calling a commercial service and has to find a client number stored in his or her terminal, the different operations to be performed during the call can prove complicated, and can even cause the call to be lost if an operation is performed incorrectly. In particular, for certain categories of people unused to modern technologies, these operations can be particularly difficult, even impossible to perform.

It is also worth noting that, in many cases, the users who make a call to a given service often ask for the same information. For example, an operator of an insurance company always begins a telephone conversation by asking for an insurance policy number. An assistance or taxi service more often than not asks for the address where the person is located. The users who contact such services have to find the information during the call or else find it beforehand when they can anticipate the request.

So as to simplify the operations to be performed in the context of a client relationship, the service providers sometimes publish dedicated applications offering direct and customized access to the services that they offer. For example, an assistance or taxi booking service may distribute an application for mobile terminals advantageously using a GPS sensor and a wireless connection of the terminal to reliably locate a person, identify him or her through a client account and transmit this information to an operator in order to improve the quality of the service.

Despite everything, it is still often necessary to set up a voice call with certain services, and the operations involved in looking up information stored in the terminal during a call in order to transmit it to another party pose a problem for which there is as yet no satisfactory solution.

There is therefore a definite need for a technical solution that makes it possible to simplify the operations needed to transmit information during a telephone call.

SUMMARY OF THE INVENTION

To this end, the invention relates to a method for transmitting data, on a terminal, in a call, such that it comprises, when a call initiated from the terminal is set up to another party, steps of determining the call number of the correspondent; of reading a configuration information item comprising at least one association between the determined call number and a datum identifier, the datum identifier being associated with a command to obtain the datum; of obtaining, by executing the associated command, the identified datum; and of transmitting the datum to a recipient.

The method according to the invention thus makes it possible to automate data transmissions suited to a particular context when a call is made to another party. With data being associated with a particular call number, the method makes it possible to automatically transmit data that are particularly relevant with regard to the called party. For example, the terminal can automatically transmit GPS coordinates and an insurance policy number when a call is made to a support service, thus reducing the operations to be performed during the call.

According to a particular embodiment, the configuration datum further comprises methods for transmitting the identified datum.

The method thus makes it possible to indicate, in a configuration file, a destination address for the datum and, for example, a transport channel for this information. For example, such a configuration file can indicate that a social security number has to be transmitted via an SMS to a particular telephone number. According to another example, the configuration file can indicate a URL (Universal Resource Locator) to be used to transmit, for example, GPS (Global Positioning system) coordinates. A same datum can be transmitted to several recipients and according to different methods.

According to a particular embodiment, the method is such that it further comprises a step of checking an authorization to send the datum to the recipient.

The method thus makes it possible to guarantee to the user that no datum will be transmitted to the other party without his or her consent. The authorization can for example be granted by the user of the terminal each time a call is set up or even on only the first call and for all subsequent calls, the authorization then being able to be revoked at any moment via a suitable interface. According to a particular embodiment the transmitted information is displayed on a screen of the terminal during the call.

According to a particular embodiment, the method is such that it first comprises steps of downloading, from a server, at least one association between the determined call number and a datum identifier, and of creating the configuration information by associating the downloaded datum identifier with a command to obtain the identified datum.

One or more associations between call numbers and data identifiers to be transmitted are stored on a server, for example in the form of a configuration file. The terminal can download this configuration file, so that the data to be transmitted in a call can be obtained by the terminal by the execution of a command associated with the datum identifier and transmitted to a recipient when a call is set up to the associated call number. The configuration file can also include an indication relating to the phase of the call in which to trigger the data transfer, such as, for example, the fact that the datum must be transmitted when the call is set up or at the end of the call. It is thus possible for a service operator to select the data that it deems necessary to transmit when contacted by a user.

According to a particular embodiment, the configuration method is such that the configuration datum comprises, for at least one data identifier, an indication relating to the mandatory or optional nature of the transmission of the identified datum.

A degree of importance is thus defined for the various data that may be requested by a service provider. In this way, the method can for example prevent a call from being set up when a datum requested by the service provider is not available on the terminal and possibly display a message prompting the user to supply the missing datum.

According to another aspect, the invention relates to a device for transmitting data in a call such that it comprises modules for determining the call number of another party; for reading a configuration datum comprising at least one association between the determined call number and a datum identifier, the datum identifier being associated with a command to obtain the datum; for obtaining, by executing the associated command, the identified datum; and for communicating appropriately to transmit the datum to a recipient.

The invention relates also to a terminal such that it comprises a data transmission device.

According to another aspect, the invention relates to a computer program comprising the instructions for the execution of the transmission method when the program is run by a processor.

The invention relates also to a processor-readable information medium on which is stored a computer program comprising the instructions for the execution of the transmission method.

The abovementioned various embodiments or features can be added independently or in combination with one another to the transmission method steps.

The terminals, devices, programs and information mediums offer at least advantages similar to those conferred by the transmission method described above.

LIST OF THE FIGURES

Figure 2:
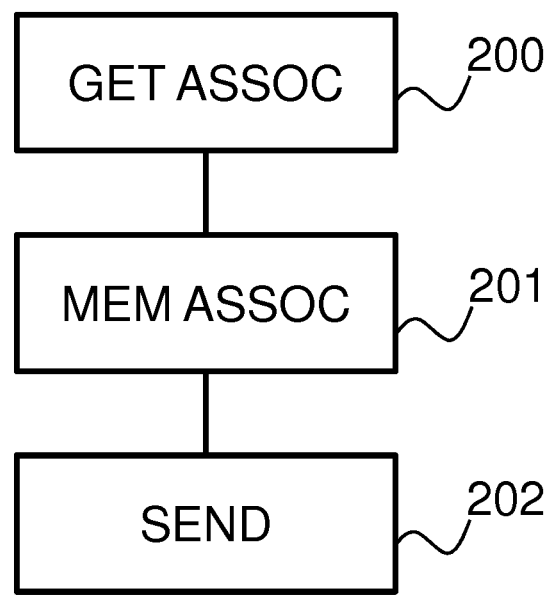
Figure 3:
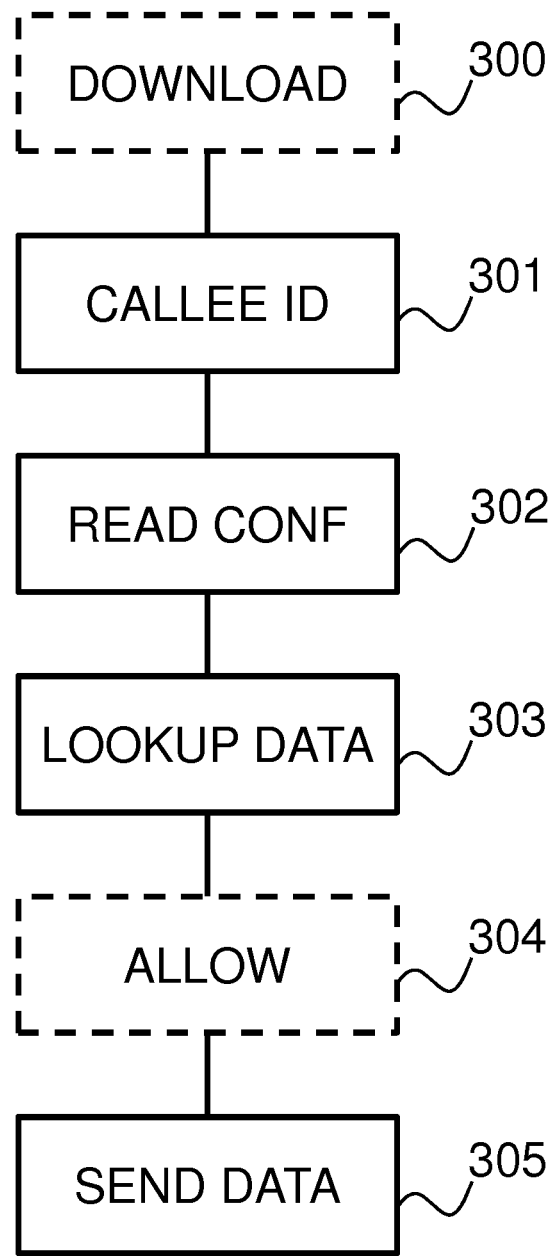
Figure 4:
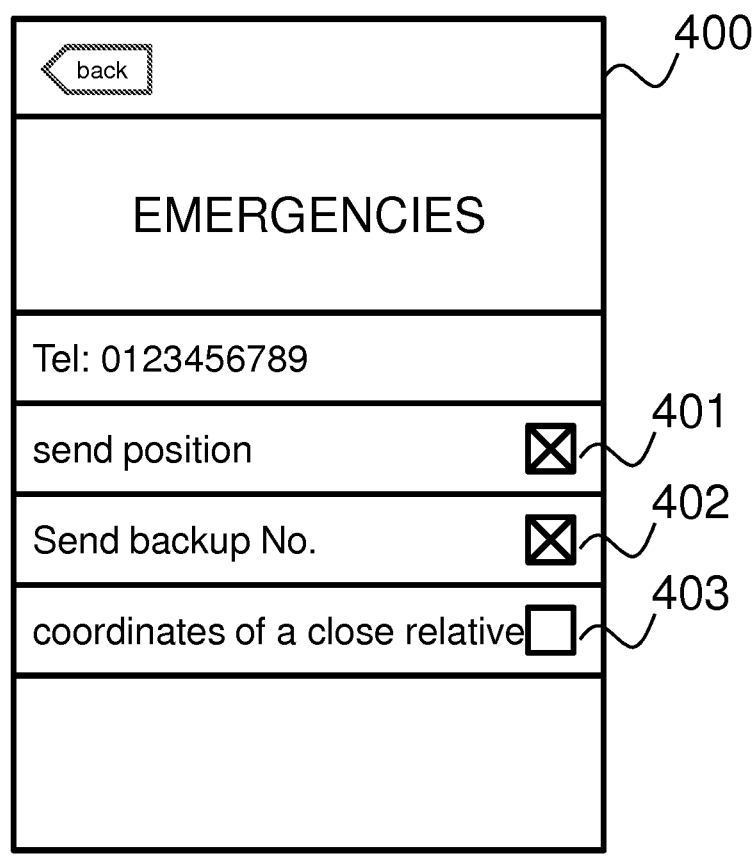
Figure 5:
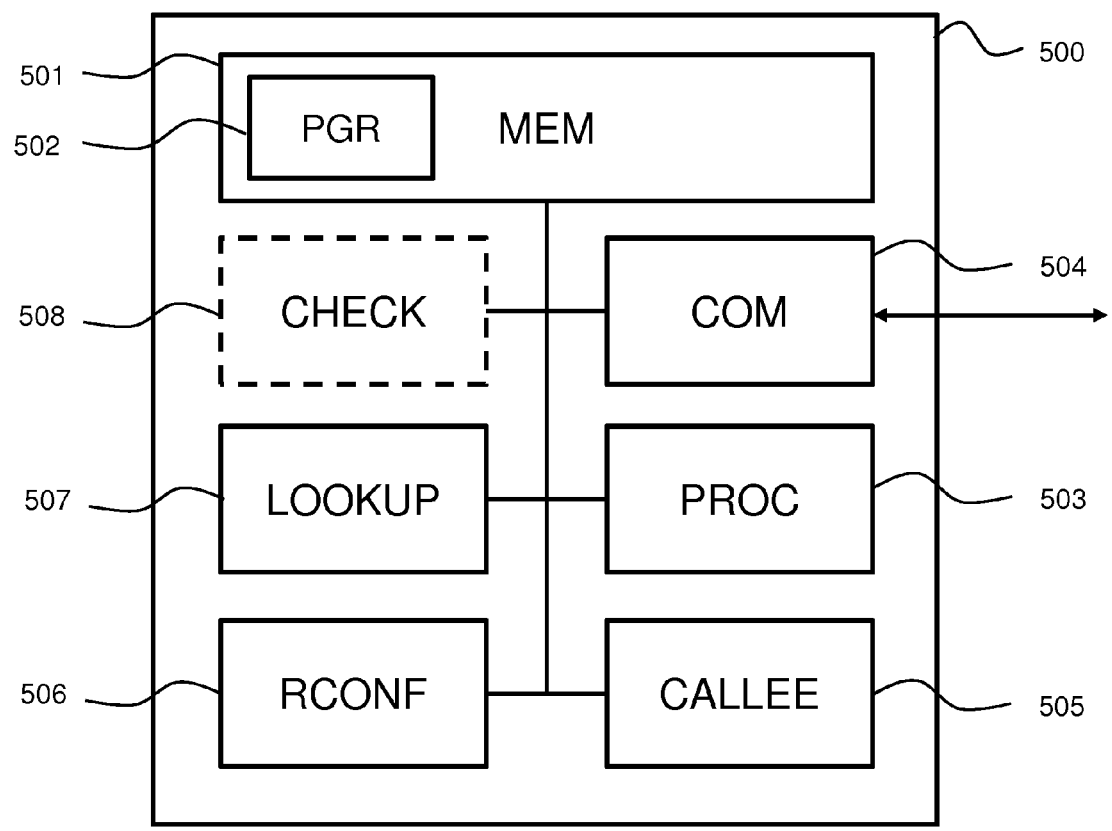

Other features and advantages of the invention will become more clearly apparent on reading the following description of a particular embodiment, given as a simple illustrative and nonlimiting example, and the attached drawings, in which:

FIG. 1 represents a simplified network architecture suitable for implementing the invention according to a particular embodiment, FIG. 2 illustrates steps for configuring a terminal suitable for implementing the transmission method according to a particular embodiment, and FIG. 3 illustrates the main steps of the data transmission method according to a particular embodiment, FIG. 4 represents an exemplary user interface suitable for displaying data identifiers associated with a call number, and FIG. 5 illustrates the architecture of a device suitable for implementing the transmission method according to a particular embodiment.

DESCRIPTION OF A PARTICULAR EMBODIMENT

FIG. 1 illustrates an architecture suitable for implementing the invention. A terminal 100 of smartphone type is connected to a communication network 101. The communication network 101 makes it possible to set up voice calls with a support service 104 and send, for example, messages of SMS (Short Message Service) type to other terminals such as, for example, to the terminal 105. The network 101 further makes it possible to connect the terminal 100 to the Internet network and exchange digital information with other equipment by using, for example, the http (HyperText Transport Protocol) protocol, and in particular to download data from the server 102. The server 102 is also connected to the network 101 and has a database 103 in which it can store and read data.

FIG. 2 illustrates preliminary configuration steps for a terminal according to a particular embodiment. In this example, this configuration is performed on the server 102 and makes it possible to configure the terminal 100.

In a first step 200, the server 102 obtains an association between a call number and at least one identifier of at least one datum to be transmitted. The server can obtain such an association following an action by a service operator such as a support service operator 104. For this, the server 102 comprises a Web server enabling a service operator to configure associations between call numbers and one or more data identifiers to be transmitted by means of a suitable interface. The service operator can thus connect to the server by using a Web browser and input, on the one hand, a call number, such as, for example, the number of a customer relation center and, on the other hand, one or more data identifiers that have to be transmitted when a user contacts the customer relations center. For example, the service operator 104 can use the interface to ask for the GPS coordinates of a calling terminal, a social security number and a call number of a close relative to be transmitted. According to a particular embodiment, the operator can also associate with each requested datum identifier an indication as to the mandatory or optional nature of the datum. For example, he or she can indicate that the transmission of the GPS coordinates and a social security number is mandatory, whereas the transmission of the information concerning the call number of a close relative is optional. Obviously, different types of data identifiers can be associated with a call number according to the context. For example, an insurance company can associate an "insurance policy number" datum type with its call number.

In the step 202, the server 102 stores the association in the database 103.

In the step 202, the server 102 transmits to the terminal 100, in the form of a configuration file for example, at least one stored association.

For example, the server can transmit a configuration file in XML format formatted as follows:

```
<assocs>
    <bindings "number" = "0123456">
        <data "id" = "location" "URL"="http://service.com"/>
        <data "id" = "insurance" "URL"="http://service.com"/>
        <data "id" = "contact" "optional" />
    </bindings>
</assocs>
```

This configuration file represents three data identifiers associated with the call number "0123456789". The different attributes and parameters used in this example are given by way of illustration and can perfectly well take other forms and be named differently. The "location" identifier here refers to the fact that GPS coordinates are required upon a call to the number indicated. The "insurance" identifier refers to the fact that a social security number is required in a call to the service. Finally, the "contact" identifier refers to the call number of a person to be contacted. This field contains an "optional" attribute denoting the optional nature of this datum. The "location" and "insurance" identifiers are also associated with transmission methods. In this example, these methods consist of a URL to which the data must be transmitted in the call, but other methods can be indicated, such as, for example, a messaging number, an email address or even a social network identifier.

FIG. 3 illustrates the main steps of the data transmission method according to a particular embodiment.

In a first optional step 300, the terminal 100 downloads a configuration file from the server 102. For this, the terminal uses an Internet access, such as, for example, a Wifi or 3G connection from the terminal, making it possible to set up a connection according to the http protocol with the server to download the file. The address of the server 102 can be input by the user in a Web browser for example, or else preconfigured previously in the terminal. This step of downloading of a configuration file can correspond to the step 202 of transmission of a configuration file described with reference to FIG. 2.

On reception of the configuration data, the terminal 100 analyzes the data identifiers in order to associate therewith a particular command making it possible to obtain them. For this, the terminal can use a table in which each identifier is associated with a command enabling the terminal to access the corresponding datum. The command can correspond to an application to be launched, a script to be executed, a search on a keyword to be launched on the file system of the terminal or even a request in a database. For example, the "location" datum identifier used in the XML configuration file described above can be associated with a command to launch a GPS application. The "insurance" datum identifier can be associated with an SQL query in a database or a configuration file of the terminal. The "contact" identifier can be associated with a search in the address book of the terminal or with a command to send SMS. According to a particular embodiment of the invention, the associations between the data identifiers and the commands allowing access thereto can be included in the downloaded configuration file.

These different associations are, according to a particularly advantageous embodiment, stored in an address book of the terminal in a record corresponding to the call number. When they are stored in an address book, for example in the main address book of the terminal 100, fields representative of the data associated with the call number can be added to the contact sheet corresponding to the call number. FIG. 4 illustrates, by way of example and schematically, a graphical interface 400 for an entry in an address book corresponding to the call number for the service 104 showing the data requested by the service through the configuration file.

In the step 301, the user of the terminal 100 dials the number of the support service 104 from the terminal. When the call is initiated, the terminal determines the number of the calling party by looking up, for example, a database of current calls.

Based on the call number, the terminal 100 searches, in a step 302, for at least one datum identifier associated and stored in the database. For this, the terminal looks up the stored configuration information comprising at least one association between the determined call number and a datum identifier. For example, the terminal can perform a search in the address book in order to find the associated data identifiers when the address book is used to store the associations between the call numbers and the data identifiers. From the datum identifier associated with the call number, the terminal looks up a table in which is stored a command whose execution makes it possible to obtain the datum. According to a particular embodiment, this table is stored in a database, the search in the table being performed by an SQL query using the datum identifier as key.

In the step 303, the terminal executes at least one command associated with the datum identifier so as to obtain the corresponding datum. For example, the command can consist of an SQL query making it possible to search for a value stored in a database or a configuration file. Such a database can contain a table dedicated to the implementation of the invention in which are stored the data corresponding to the identifiers, the table having been previously completed by the user. According to a particular embodiment, a table storing the data values in association with the corresponding identifiers is stored on a server that can be accessed via an Internet connection from the terminal. In this way, the data can be obtained from different terminals of the user. The command can also consist in launching an application previously installed on the terminal, in interrogating a sensor such as a GPS location module or even in launching a search from notes, messages or even, for example, in the file system of the terminal.

In an optional step 304, the terminal can check whether an authorization is granted to transmit the datum, an authorization to transmit a datum for a given call number being able to be stored for subsequent calls. For this, the terminal can, conventionally, display a message on the screen of the terminal prompting the user to give his or her agreement for the transmission of the datum. The authorizations to transmit a particular datum can also be given or withdrawn by the user from a contact sheet of the address book, for example via the check boxes 401, 402 and 403 illustrated in FIG. 4. According to a particular embodiment, this step can be performed before the execution of the command to obtain a datum.

Finally, in the step 305, when an authorization is granted, the terminal transmits to a recipient the datum obtained by the execution of the command. According to a particular embodiment, the datum is transmitted according to a method indicated in the configuration information. The method for transmitting a datum can comprise an address of a recipient, for example a URL, a call number, an email address, or even for example an address on a social network. Each datum to be transmitted can be transmitted to a plurality of recipients according to different methods. Referring to the example cited above, the datum corresponding to the "location" identifier is transmitted via an Internet connection from the terminal by using the URL "http://service.com". A transmission method may also relate to a transmission of the datum to a recipient identified by a call number. In this way, a datum can be transmitted by a messaging service such as an SMS service. For example, the terminal 100 can transmit an SMS to the terminal 105 when it sets up a call to the support service 104. In this way, it is possible to automatically alert a close relative when a user invokes a support service.

According to a particular embodiment, communication can be blocked when data indicated as mandatory in the configuration information are not available or do not have a transmission authorization granted by the user. In this way, a service operator can be sure of not being contacted by a user who does not have an information item necessary to render the service, such as, for example, a client identifier for a customer relation service.

FIG. 5 illustrates a device 500 implementing the transmission method according to a particular embodiment of the invention. The device comprises a storage space 501, for example a memory MEM, a processing unit 503 equipped for example with a processor PROC. The processing unit can be driven by a program 502, for example a computer program PGR, implementing the transmission method as described in the invention with reference to FIG. 3, and notably the steps of determining the call number of the other party, of reading a configuration information item comprising at least one association between the determined call number and a datum identifier, the datum identifier being associated with a command to obtain the datum, of obtaining, by executing the associated command, the identified datum, and of transmitting the datum to a recipient.

The memory 501 stores, for example, the associations between the call numbers, the data identifiers and the commands to obtain the data.

On initialization, the instructions of the computer program 502 are, for example, loaded into a RAM (Random Access Memory) memory before being executed by the processor of the processing unit 503. The processor of the processing unit 503 implements the steps of the transmission method according to the instructions of the computer program 502.

For this, the device comprises, in addition to the memory 501, a communication module 504 (COM) enabling the device to transmit data obtained by the execution of commands associated with data identifiers, said identifiers being associated with a call number in a configuration information item. The communication module can also be used to download a configuration information item comprising one or more data identifiers associated with a call number. The communication module can also be used to set up calls to a call number. This communication module 504 can correspond, for example, to a network interface of Wifi, Bluetooth, GSM, 3G or Ethernet type and makes it possible to set up data connections and/or voice calls.

The device also comprises a module 505 (CALLEE) for determining a called number. It can, for example, be a GSM communication management module or a module for accessing a database of calls in progress.

The device 500 further comprises a module 506 (RCONF) for reading a configuration information item comprising at least one association between the determined call number and a datum identifier, the datum identifier being associated with a command to obtain the datum. This module 506 can for example be a module for accessing a database such as an address book database of the terminal.

The device also comprises a module 507 (LOOKUP) suitable for executing a command in order to obtain a datum associated with a datum identifier, such as, for example, a command interpreter module and, optionally, a module 508 (CHECK) for checking an authorization to transmit a datum to a recipient.

According to a particular embodiment, the device is incorporated in a communication terminal of smartphone or tablet type or even in a personal computer.

The invention claimed is:

1. Method for transmitting data, on a terminal, in a call, characterized in that it comprises, when a call initiated from the terminal is set up to another party, the following steps:
   determining (301) the call number of the correspondent,
   downloading, from a server, at least one association between the determined call number and a datum identifier,
   creating a configuration information item by associating the downloaded datum identifier with a command to obtain the identified datum,
   reading (302) the configuration information item comprising at least one association between the determined call number and a datum identifier, the datum identifier being associated with a command to obtain the datum,
   obtaining (303), by executing the associated command, the identified datum, and
   transmitting (305) the datum to a recipient.

2. Method according to claim 1, characterized in that the configuration information item further comprises methods for transmitting the identified datum.

3. Method according to claim 1, characterized in that it further comprises a step of checking an authorization to send the datum to the correspondent.

4. Device for transmitting data in a call characterized in that it comprises modules for:
   determining (505) the call number of another party,
   downloading, from a server, at least one association between the determined call number and a datum identifier,
   creating a configuration information item by associating the downloaded datum identifier with a command to obtain the identified datum,
   reading (506) the configuration datum comprising at least one association between the determined call number and a datum identifier, the datum identifier being associated with a command to obtain the datum,
   obtaining (507), by executing the associated command, the identified datum, and
   communicating (504) appropriately to transmit the datum to a recipient.

5. Terminal, characterized in that it comprises a data transmission device for transmitting data in a call characterized in that it comprises modules for:
   determining (505) the call number of another party,
   downloading, from a server, at least one association between the determined call number and a datum identifier,
   creating a configuration information item by associating the downloaded datum identifier with a command to obtain the identified datum,
   reading (506) a configuration datum comprising at least one association between the determined call number and a datum identifier, the datum identifier being associated with a command to obtain the datum,
   obtaining (507), by executing the associated command, the identified datum, and
   communicating (504) appropriately to transmit the datum to a recipient.

6. A Computer program comprising instructions for execution of a transmission method, when the program is run by a processor, the method for transmitting data, on a terminal, in a call, characterized in that it comprises, when a call initiated from the terminal is set up to another party, the following steps:
   determining (301) the call number of the correspondent,
   downloading, from a server, at least one association between the determined call number and a datum identifier,
   creating a configuration information item by associating the downloaded datum identifier with a command to obtain the identified datum,
   reading (302) a configuration information item comprising at least one association between the determined call number and a datum identifier, the datum identifier being associated with a command to obtain the datum,
   obtaining (303), by executing the associated command, the identified datum, and
   transmitting (305) the datum to a recipient.

7. A Processor-readable information medium on which is stored a computer program comprising instructions for execution of a transmission method, when the program is run by a processor, the method for transmitting data, on a terminal, in a call, characterized in that it comprises, when a call initiated from the terminal is set up to another party, the following steps:

determining (301) the call number of the correspondent, downloading, from a server, at least one association between the determined call number and a datum identifier, creating a configuration information item by associating the downloaded datum identifier with a command to obtain the identified datum, reading (302) a configuration information item comprising at least one association between the determined call number and a datum identifier, the datum identifier being associated with a command to obtain the datum, obtaining (303), by executing the associated command, the identified datum, and transmitting (305) the datum to a recipient.

8. Method according to claim 2, characterized in that it further comprises a step of checking an authorization to send the datum to the correspondent.

\* \* \* \* \*